United States Patent [19]

Fritch et al.

[11] Patent Number: 5,248,125
[45] Date of Patent: Sep. 28, 1993

[54] REFRIGERANT SERVICE SYSTEM WITH SELF-SEALING COUPLING

[75] Inventors: Brian D. Fritch, Stryker; Gregory F. Scott, Montpelier, both of Ohio

[73] Assignee: SPX Corporation, Muskegon, Mich.

[21] Appl. No.: 862,209

[22] Filed: Apr. 2, 1992

[51] Int. Cl.$^5$ ............................................. F16L 37/28
[52] U.S. Cl. ............................ 251/149.6; 137/614.02
[58] Field of Search ................ 251/149, 149.1, 149.6; 137/614, 614.02, 614.05, 614.03, 614.04

[56] References Cited

U.S. PATENT DOCUMENTS

| | | | |
|---|---|---|---|
| 2,177,278 | 10/1939 | Hill et al. | 251/149.6 X |
| 2,777,716 | 1/1957 | Gray | 251/149.6 X |
| 2,919,935 | 1/1960 | Nyberg | 251/149.6 X |
| 3,706,318 | 12/1972 | Baniadam et al. | 251/149.4 X |
| 3,851,666 | 12/1974 | Hammond | 251/149.6 X |
| 4,182,370 | 1/1980 | Karcher | 137/614.02 X |
| 4,200,121 | 4/1980 | Walter et al. | 251/149.6 X |
| 4,768,347 | 9/1988 | Manz et al. | 62/149 |
| 5,005,375 | 4/1991 | Manz et al. | 137/614.02 |
| 5,056,560 | 10/1991 | DeMartelaere | 137/614.04 |
| 5,080,132 | 1/1992 | Manz et al. | 137/614.04 |

Primary Examiner—Martin P. Schwadron
Assistant Examiner—Kevin L. Lee
Attorney, Agent, or Firm—Barnes, Kisselle, Raisch, Choate, Whittemore & Hulbert

[57] ABSTRACT

A self-sealing coupling for connection to a fluid fitting having an open end of predetermined configuration includes an adapter having an axial passage and an open end contour to be received over the open end of the fitting. A poppet is disposed in the passage and extends to the open end of the adapter for engaging the fitting as the adapter is received over the fitting. A spring is disposed in the passage for urging the poppet into sealing engagement with the adapter, and a coupler nut is rotatably mounted on the adapter for releasably threadably fastening the adapter and coupling to the external threads of the fitting. The adapter passage includes a conical seat opposed to the poppet, and the poppet includes a conical shoulder opposed to the seat and of greater diameter than minimum diameter of the seat. This conical seat/shoulder construction not only enhances sealing between the poppet and adapter, but also makes the poppet self-centering within the adapter passage. An O-ring is carried within a radially oriented channel on the poppet for engaging the conical seat radially outwardly of the poppet shoulder, and thereby enhancing sealing between the poppet and adapter.

12 Claims, 1 Drawing Sheet

REFRIGERANT SERVICE SYSTEM WITH SELF-SEALING COUPLING

The present invention is directed to a self-sealing coupling for interconnecting refrigerant service systems with refrigerant equipment under service while avoiding leakage of refrigerant to the atmosphere.

BACKGROUND AND OBJECTS OF THE INVENTION

U.S. Pat. Nos. 5,005,375 and 5,080,132, both assigned to the assignee hereof, disclose systems for servicing refrigeration equipment, such as air conditioning and heat pump equipment, by recovering refrigerant from such equipment, purifying the recovered refrigerant for removal of water or other contaminants, and/or charging the refrigeration equipment under service using stored or purified refrigerant. The systems disclosed in the noted patents feature self-sealing couplings adapted for mating engagement with externally threaded fittings of standard configuration on the equipment under service to facilitate interconnection with the service systems while substantially reducing likelihood of loss of refrigerant to the atmosphere, as well as any requirement for evacuating the interconnection hoses prior to use of the service systems.

The self-sealing couplings disclosed in the above-noted patents include an adapter having an internal bore or passage and a poppet urged by a spring toward the open end of the passage for engagement with an equipment service fitting when the adapter is received over the fitting. Either the adapter or the poppet carries a sealing ring for engagement with the opposing element under force of the spring to seal the passage when the coupling is not fastened to a fitting. A coupling element is movably mounted on the adapter for engagement with external threads on the service fitting releasably to fasten the coupling to the fitting while opening the poppet valve within the passage. The coupling element may comprise a coupler nut having internal threads for engagement with external threads on the fitting, or a quick-disconnect coupler with cam-operated sections for engaging the external threads on the fitting.

A general object of the present invention is to provide an improved coupling of the type disclosed in the noted patents in which the poppet is self-centering within the adapter passage, in which opening of the poppet yields more rapid flow of refrigerant through the coupling for enhanced efficiency of service, and/or that obtains improved sealing between the adapter on the one hand and the service fitting and poppet on the other.

SUMMARY OF THE INVENTION

A self-sealing coupling for connection to a fluid fitting having an open end of predetermined configuration in accordance with the present invention includes an adapter having an axial passage or bore and an open end contour to be received over the open end of the fitting. A poppet is disposed in the passage and extends to the open end of the adapter for engaging the fitting as the adapter is received over the fitting. A spring is disposed in the passage for urging the poppet into sealing engagement with the adapter, and a coupler nut is rotatably mounted on the adapter for releasably threadably fastening the adapter and entire coupling assembly to the external threads of the fitting. In accordance with a first aspect of the present invention, the adapter passage includes a conical seat opposed to the poppet, and the poppet includes a conical shoulder opposed to the seat and of greater diameter than minimum diameter of the seat. This conical seat/shoulder construction not only enhances sealing between the poppet and adapter, but also makes the poppet self-centering within the adapter passage. An O-ring is carried within a radially oriented channel on the poppet for engaging the conical seat radially outwardly of the poppet shoulder, and thereby enhancing sealing between the poppet and adapter.

In accordance with a second aspect of the invention, the coupler includes a first annular resilient sealing ring at the open end of the passage for sealing engagement with the fitting when the adapter is received over the fitting, and a second annular resilient sealing ring spaced from the first ring for sealingly engaging a shoulder on the poppet when the poppet is urged against the second sealing ring by the coil spring within the adapter. This separation of sealing functions obtains improved sealing with both the poppet and the fitting when the coupling assembly is received over the fitting. A rib or shoulder projects radially inwardly from the adapter to separate the first and second sealing rings, and the poppet urges the second sealing ring against the ledge under force of the coil spring when the poppet is in sealing engagement with the second ring. The adapter includes an adapter head and a separate adapter end threaded into the head, with a projection on the adapter end capturing the second sealing ring against the adapter ledge.

BRIEF DESCRIPTION OF THE DRAWING

The invention, together with the additional objects, features and advantages thereof, will be best understood from the following description, the appended claims and the accompanying drawing in which:

DETAILED DESCRIPTION OF PREFERRED EMBODIMENTS

Figure 1:
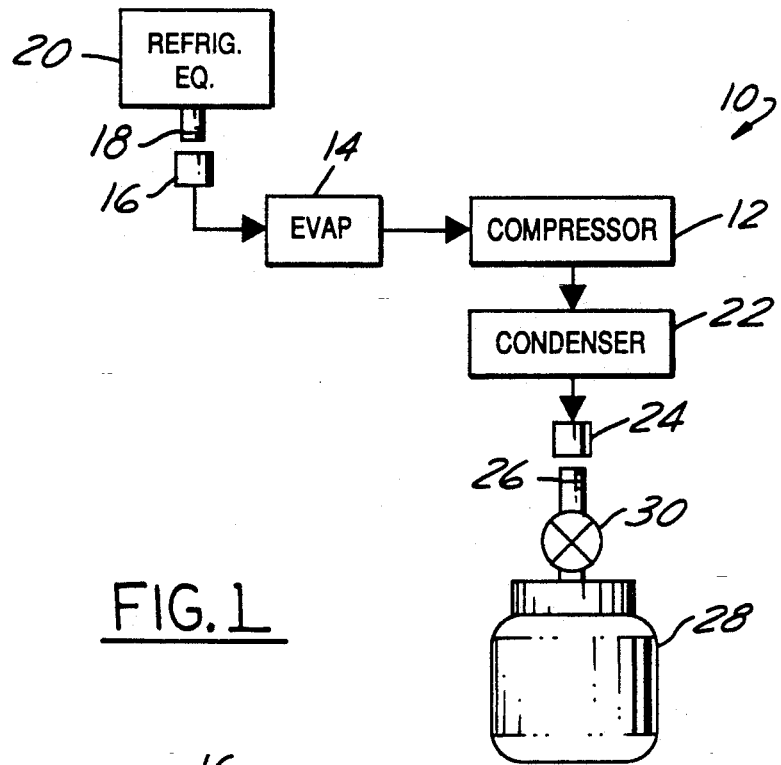
FIG. 1 is a schematic diagram of refrigeration service equipment in connection with which the coupling assembly of the present invention finds particular utility.

FIG. 1 illustrates a refrigerant recovery system 10 that includes a compressor 12 having an inlet for connection through an evaporator 14 and a coupling assembly 16 to the service fitting 18 of refrigeration equipment 20. The outlet of compressor 12 is connected through a condenser 22 and a coupling assembly 24 to the fitting 26 of a refrigerant storage vessel or container 28. In use, coupling 16 is fastened to fitting 18, and coupling 24 is fastened to fitting 26. The manual valve 30 on container 28 is opened, and compressor 12 is energized. Refrigerant is drawn from equipment 20 through evaporator 14 to compressor 12, and then fed by compressor 12 through condenser 22 to storage container 28. A refrigerant recovery system 10 of the described character is disclosed in greater detail in U.S. Pat. No. 4,768,347 assigned to the assignee hereof, to which reference may be made for more detailed discussion.

Figure 2:
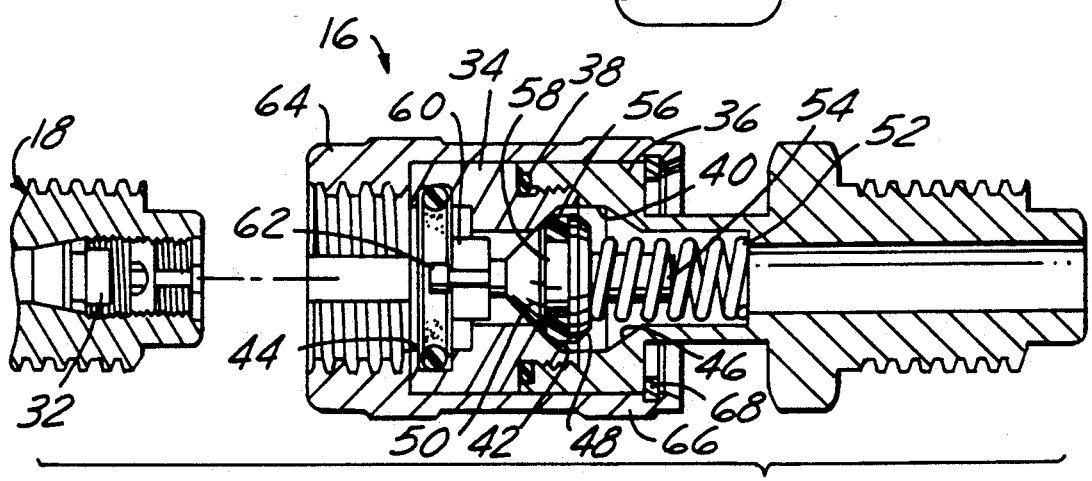
FIG. 2 is a fragmentary sectional view diametrically bisecting a self-sealing coupling for refrigeration equipment service in accordance with a presently preferred embodiment of the invention.
Figure 3:
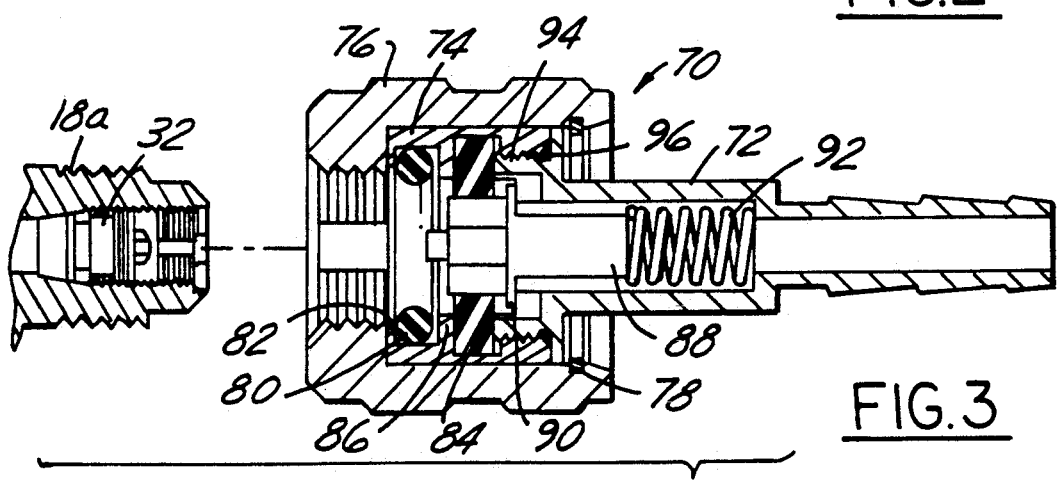
FIG. 3 is a fragmentary sectional view similar to that of FIG. 2, but showing a self-sealing coupling in accordance with a modified embodiment of the invention.

FIG. 2 shows coupling assembly 16 and fitting 18 in greater detail. (Coupling assembly 24 and fitting 26 may be identical to coupling 16 and fitting 18.) Service fitting 18 is of preselected industry standard configuration, such as SAE standard J2197 (FIG. 2) for R134a refrigerant with half-inch ACME threads, or one-quarter inch SAE flair size conforming to ANSI standard B70.1 (1974). as shown in FIG. 3 for R12 refrigerant, R22 refrigerant, etc. A conventional Schraeder-type valve 32 is positioned within fitting 18 (FIG. 2) or 18a (FIG. 3) for sealing the fitting.

Coupling assembly 16 (FIG. 2) includes an adapter head 34 and an adapter, end 36 threadably received over head 34, with an O-ring 38 captured therebetween. Adapter head 34 and adapter end 36 together form a bore or passage 40 that extends entirely through the coupler. A conical shoulder 42 is formed in passage 40 within adapter head 34 facing away from the open end 44 of the adapter head. Likewise, a conical seat 46 is formed in passage 40 within adapter end 36 facing adapter open end 44. Conical seats 42, 46 and the reach of passage 40 extending therebetween form a generally open pocket between the mating ends of adapter head 34 and adapter end 36 coaxial with the length of passage 40.

A poppet 48 is captured in assembly between adapter head 34 and adapter end 36. Poppet 48 has a conical shoulder 50 opposed to conical seat 42 of passage 40 and of greater diameter than the minimum diameter of seat 42. A coil spring 52 is captured in compression between poppet 48 and an opposing seat on adapter end 36 for urging shoulder 50 against seat 42. A finger 54 extending from poppet 48 within coil spring 52 helps maintain relative position between the poppet and coil spring. A gasket 56 of rectangular cross section is captured within a radially oriented channel 58 adjacent to the outer end of shoulder 50 for engaging seat 42 radially outwardly of shoulder 50, and thereby assisting sealing between poppet 48 and adapter head 34.

A projection 60 on poppet 48 is positioned adjacent to adapter open end 44 for engaging the end of fitting 18 when the adapter is received over the fitting, and thereby urging poppet 48 out of sealing engagement with the adapter against the force of spring 52. A nose 62 on projection 60 engages the stem of valve 32 for opening valve 32 within fitting 18. A coupler nut 64 is rotatably externally received over adapter 34, 36, and has internal threads adjacent to open adapter end 44 for mating engagement with the external threads on fitting 18. A skirt 66 surrounds adapter head 34 and adapter end 36, and a retaining ring 68 captures the adapter sections in assembly within nut 64.

FIG. 3 illustrates a modified coupling assembly 70 in which the adapter end 72 is internally threadably received within the adapter head 74. Again, a coupler nut 76 is rotatably mounted on the adapter sections, with internal threads for receipt over fitting 18a. The adapter sections are retained within coupler nut 76 by a retaining ring 78. Within adapter head 74, a first annular resilient sealing ring 80 is positioned adjacent to the open end 82 of the adapter head for sealing engagement with the opposing end of fitting 18a when coupling 70 is received thereover. A second annular resilient sealing ring 84 is positioned within adapter head 74 spaced from sealing ring 80 and separated therefrom by a radially inwardly extending rib or ledge 86. A poppet 88 is captured within adapter end 72, and has a shoulder 90 urged by a coil spring 92 into sealing engagement with ring 84. Thus, poppet 88 urges ring 84 against ledge 86 in the closed condition of coupler 70 illustrated in FIG. 3. A projection 94 on adapter end 72 holds ring 88 in assembly against ledge 86 for firmly positioning ring 84 in desired position, and for cooperating with O-ring 96 for sealing the adapter sections to each other. Thus, in the embodiment of FIG. 3, the functions of sealing poppet 88 and fitting 18 are divided between ring 84 and ring 80 for improved operation of both parts. Ring 80 is preferably of circular cross section, as shown in FIG. 3, and ring 84 is preferably of rectangular cross section.

It will be appreciated of course, that the self-sealing couplings of the present invention are not limited to any particular standard fitting configuration or thread size, as hereinabove described. Likewise, the adapter end may have threads of standard configuration as shown in FIG. 2, a hose barb as shown in FIG. 3, or a male flair (not shown).

We claim:

1. A self-sealing coupling for connection to a fluid fitting having an open end of predetermined contour and external threads circumferentially surrounding the open end of the fitting, said coupling comprising:

adapter means having an axial passage and an open end contoured to be received over the open end of the fitting, a poppet disposed in said passage and including means adjacent to said open end of said passage for engaging the fitting when said adapter means is fitted thereto, first annular resilient sealing means at said passage open end for sealingly engaging the open end of the fitting when said adapter means is received thereover, second annular resilient sealing means within said passage spaced from said first means, said poppet having a shoulder for sealing engagement with said second means, a spring within said passage engaging said poppet for urging said shoulder against said second means, and means on said adapter means for releasably fastening said adapter means to the fitting, said releasably-fastening means comprising a coupler nut rotatably mounted on said adapter means and having internal threads for threadably engaging the external threads on the fitting, said coupler nut including a skirt surrounding said adapter means and a retaining ring releasably capturing said adapter means within said skirt.

2. The coupling set forth in claim 1 wherein said adapter means includes a ledge projecting radially into said passage between said first and second means, said spring urging said poppet against said second means and said second means against said ledge.

3. The coupling set forth in claim 2 wherein said adapter means comprises an adapter head and adapter end assembled to each other with said poppet and said spring being captured in said passage, said adapter end including means for engaging said second means in assembly for holding said second means against said ledge.

4. The coupling set forth in claim 3 wherein said first annular resilient sealing means is of circular cross section and said second annular resilient sealing means is of rectangular cross section.

5. The coupling set forth in claim 1 wherein said first annular resilient sealing means is of circular cross section and said second annular resilient sealing means is of rectangular cross section.

6. A self-sealing coupling for connection to a fluid fitting having an open end of predetermined configuration and external threads circumferentially surrounding the open end of the fitting, said coupling comprising:

adapter means having an axial passage and an open end contoured to be received over the open end of the fitting, said adapter means including a conical seat in said passage facing away from said open end of said adapter means, a poppet disposed in said passage and including means adjacent to said open end of said adapter means for engaging the fitting as said adapter means is fitted thereto, said poppet including a conical shoulder opposed to said conical seat and of diameter greater than minimum diameter of said seat for seating against said seat, a spring in said passage urging said shoulder against said seat, means on said adapter means for releasably fastening said adapter means to the fitting, and annular resilient sealing means carried by said poppet adjacent to said shoulder for sealing engagement with said passage radially outwardly of said shoulder when said shoulder is seated against said seat, said adapter means comprising an adapter head and adapter end assembled to each other with said poppet and said spring being captured in said passage, said releasably-fastening means comprising a coupler nut rotatably mounted on said adapter means and having internal threads for threadably engaging the external threads on the fitting, said coupler nut including a skirt surrounding said adapter means and a retaining ring releasably capturing said adapter means within said skirt.

7. A self-sealing coupling for connection to a fluid fitting having an open end of predetermined configuration and external threads circumferentially surrounding the open end of the fitting, said coupling comprising:

adapter means having an axial passage and an open end contoured to be received over the open end of the fitting, said adapter means including a conical seat in said passage facing away from said open end of said adapter means, a poppet disposed in said passage and including means adjacent to said open end of said adapter means for engaging the fitting as said adapter means is fitted thereto, said poppet including a conical shoulder opposed to said conical seat and of diameter greater than minimum diameter of said seat for seating against said seat, a spring in said passage urging said shoulder against said seat, and means on said adapter means for releasably fastening said adapter means to the fitting, said releasably-fastening means comprising a coupler nut rotatably mounted on said adapter means and having internal threads for engaging the external threads on the fitting, said coupler nut including a skirt surrounding said adapter means and a retaining ring releasably capturing said adapter means within said skirt.

8. The coupling set forth in claim 7 further comprising annular resilient sealing means carried by said poppet adjacent to said shoulder for sealing engagement with said passage radially outwardly of said shoulder when said shoulder is seated against said seat.

9. The coupling set forth in claim 8 wherein said poppet includes a channel extending around said poppet adjacent to said shoulder, said annular resilient sealing means being disposed in said channel.

10. The coupling set forth in claim 8 wherein said adapter means further includes a second conical seat spaced from the first seat, said poppet shoulder being positioned between the first and second seats.

11. The coupling set forth in claim 8 wherein said adapter means comprises an adapter head and adapter end assembled to each other with said poppet and said spring being captured in said passage.

12. A self-sealing coupling for connection to a fluid fitting having an open end of predetermined contour and external threads circumferentially surrounding the open end of the fitting, comprising:

adapter means having an axial passage and an open end contoured to be received over the open end of the fitting, a poppet disposed in said passage and including means adjacent to said open end of said passage for engaging the fitting when said adapter means is fitted thereto, first annular resilient sealing means of circular cross section at said passage open end for sealingly engaging the open end of the fitting when said adapter means is received thereover, second annular resilient sealing means of rectangular cross section within said passage spaced from said first means, said poppet having a shoulder for sealing engagement with said second means, a spring within said passage engaging said poppet for urging said shoulder against said second means, and means on said adapter means for releasably fastening said adapter means to the fitting, said adapter means including a ledge projecting radially into said passage between said first and second means, said spring urging said poppet against said second means and said second means against said ledge, said adapter means comprising an adapter head and adapter end assembled to each other with said poppet and said spring being captured in said passage, said adapter end including means for engaging said second means in assembly for holding said second means against said ledge, said releasably-fastening means comprising a coupler nut rotatably mounted on said adapter means and having internal threads for threadably engaging the external threads on the fitting, said coupler nut including a skirt surrounding said adapter means and a retaining ring releasably capturing said adapter means within said skirt.

* * * * *